United States Patent [19]

Williams

[11] 3,838,915

[45] Oct. 1, 1974

[54] SINGLE FRAME DEVICE FOR MOTION PICTURE CAMERA

[75] Inventor: Francis A. Williams, Rochester, N.Y.

[73] Assignee: Eastman Kodak Company, Rochester, N.Y.

[22] Filed: Apr. 30, 1973

[21] Appl. No.: 355,619

[52] U.S. Cl. ............................................. 352/169
[51] Int. Cl. ......................................... G03b 21/38
[58] Field of Search............................ 352/169, 137

[56] References Cited
UNITED STATES PATENTS
3,178,721   4/1965   Kamp................................ 352/169

*Primary Examiner*—Monroe H. Hayes
*Attorney, Agent, or Firm*—Mr. J. Morrow

[57] ABSTRACT

A motion picture camera is provided with a single frame device which is selectively operable to control the camera drive mechanism of the camera such that each time the trigger assembly of the camera is actuated by the operator, a single frame of film is exposed and then an electric drive motor is automatically de-energized even if the operator has not released the trigger assembly of the camera. The de-energizing of the electric drive motor by the single frame device eliminates unnecessary and undesirable power drain from the power supply.

6 Claims, 4 Drawing Figures

SINGLE FRAME DEVICE FOR MOTION PICTURE CAMERA

BACKGROUND OF THE INVENTION

1. Field of the Invention

The present invention relates to motion picture cameras and more specifically to a single frame device for controlling the drive mechanism of a motion picture camera to permit a single frame mode of operation wherein the electric drive motor is automatically de-energized after the exposure of a single frame.

2. Description of the Prior Art

Various mechanisms are known in the motion picture camera art for providing a single frame mode of operation for motion picture cameras. For example, see U.S. Pat. Nos. 1,295,081; 2,198,417; 2,453,301; 3,094,033; 3,106,126; and 3,178,721. While the prior art mechanisms disclosed in the aforementioned patents are suitable for effective exposure of single frames of film, they do not teach a single frame mechanism controlling the electric drive motor of the camera to turn off the camera after a single frame of film has been exposed. This additional feature is important for it prevents the undesirable condition wherein the drive motor continues to draw current from the power supply of the camera until the trigger switch of the camera is released by the operator.

SUMMARY OF THE INVENTION

Accordingly, it is an object of the present invention to provide an improved single frame device which, when actuated, provides for exposing a single frame of motion picture film each time the trigger assembly is actuated, the device also being effective to de-energize the electric driver motor of the camera after the single frame is exposed, thereby eliminating power drain by the motor.

A further object of the present invention is to provide a single frame device for a motion picture camera providing for minimal drain upon the electric supply for the camera by providing for energizing of the electric drive motor of the camera only during the exposure of a single frame of film, the motor being energized by the actuation of the trigger of the camera but being de-energized immediately after the exposing of a single frame.

According to a preferred embodiment of the present invention, a single frame device is provided for successively advancing each of a plurality of image frames of a received film strip, the device including drive means for advancing the film, control means for selectively energizing the drive means, and restraining means operatively coupled to the control means for causing the control means to de-energize the drive means after the film strip has been advanced by one image frame by the drive means.

The invention and its objects and advantages will become more apparent in the detailed description of the preferred embodiment presented below.

BRIEF DESCRIPTION OF THE DRAWINGS

In the detailed description of the preferred embodiment presented below, reference is made to the accompanying drawings in which.

DESCRIPTION OF THE PREFERRED EMBODIMENT

Figure 1:
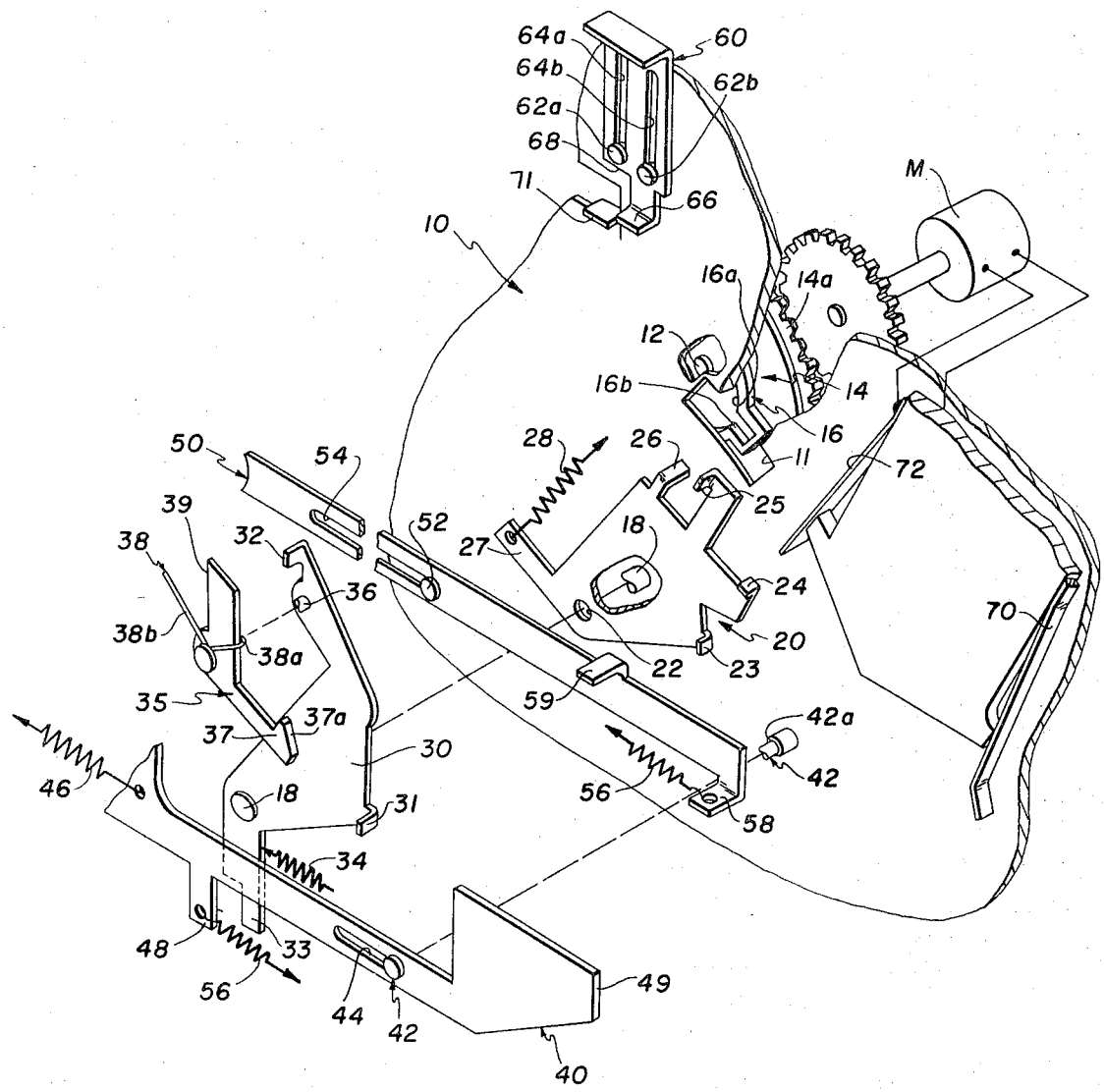
FIG. 1 is an exploded perspective view of a portion of a motion picture camera incorporating a preferred embodiment of a single frame device of this invention, certain portions of the camera being broken away or omitted to better show the present invention.

Because photographic apparatus are well known, the present description will be directed in particular to elements forming part of, or cooperating more directly with, the present invention, apparatus not specifically shown or described herein being understood to be selectable from those known in the art.

The embodiment of the present invention shown in the accompanying drawings and discussed herein is especially suitable for use with a motion picture camera of the embodiment disclosed in detail in commonly-assigned U.S. Pat. No. 3,724,937, issued Apr. 3, 1973, in the name of Jenkins et al., the disclosure of that patent being herein incorporated by reference.

Referring now to the drawings, there is illustrated a portion of a motion picture camera housing or mechanism plate designated 10 supporting a single frame device suitable for providing single frame mode of operation. A gear 14 (corresponding to the cam 80 of the Jenkins et al. patent) is secured to a shaft 12 which extends from the rear side of the housing 10. Gear 14 includes gear teeth 14a which are suitable for inclusion in a gear train (as disclosed in the Jenkins et al. patent) such that a camera drive motor M (schematically shown) is effective to drive the shutter drive mechanism (not shown) and/or the film advancing mechanism (not shown) of the camera. Preferably, the gear ratio between gear 14 and the gear train is such that one frame of a received film strip can be exposed during each revolution of gear 14.

Secured to the inner surface of gear 14 (between the gear 14 and the housing 10) is a restraining member 16 which is preferably integral with the gear 14. The restraining member 16 (corresponding to the recess 88 of the Jenkins et al. patent), preferably includes a generally cylindrical cam surface 16a having an enlarged, radially-extending cutaway section further defining a detent or stop portion 16b which resembles a slot or keyway. The purpose of this detent or stop portion 16b will be described in detail later.

A bracket 20 is mounted adjacent to the front side of the housing 10 by a rivet 18 which extends through an opening 22 in bracket 20 and then through an opening in a crank arm 30 to to pivotally secure both the crank arm 30 and the bracket 20 to the housing 10. The bracket 20 and the crank arm 30 are both irregularly shaped and they respectively include a plurality of projections or tab members 23, 24, 25 and tab members 31, 32, 33. Bracket 20 further includes a pawl 26 which projects through the arcuate slot 11 in the housing 10 wherein it is engageable with the cylindrical cam surface 16a and the detent portion 16b of the restraining member 16. In the preferred embodiment illustrated, a spring 28 is secured to an arm 27 of the bracket 20 and also to a portion of the housing 10 for resiliently urging bracket 20 in a clockwise direction about rivet 18 such that bracket 20 is normally urged toward the restraining (FIG. 1) position wherein the pawl is in engagement with the detent or stop portion 16b. However, as will be explained in greater detail, once the pawl 26 has been removed from the detent portion 16b, and the restraining member 16 has been rotatably driven, the cylindrical cam surface 16a of the restraining member 16, through cooperation with the pawl 26, is effective to hold bracket 20 in the position shown in FIGS. 2, 3 and 4 against the urging of spring 28 until the restraining member 16 is rotated once again to the restraining position wherein pawl 26 is received into the detent or stop portion 16b of the restraining member 16 for restraining the gear 14 from rotation and for de-energizing the camera drive motor M in a manner which will be described in greater detail.

Figure 2:
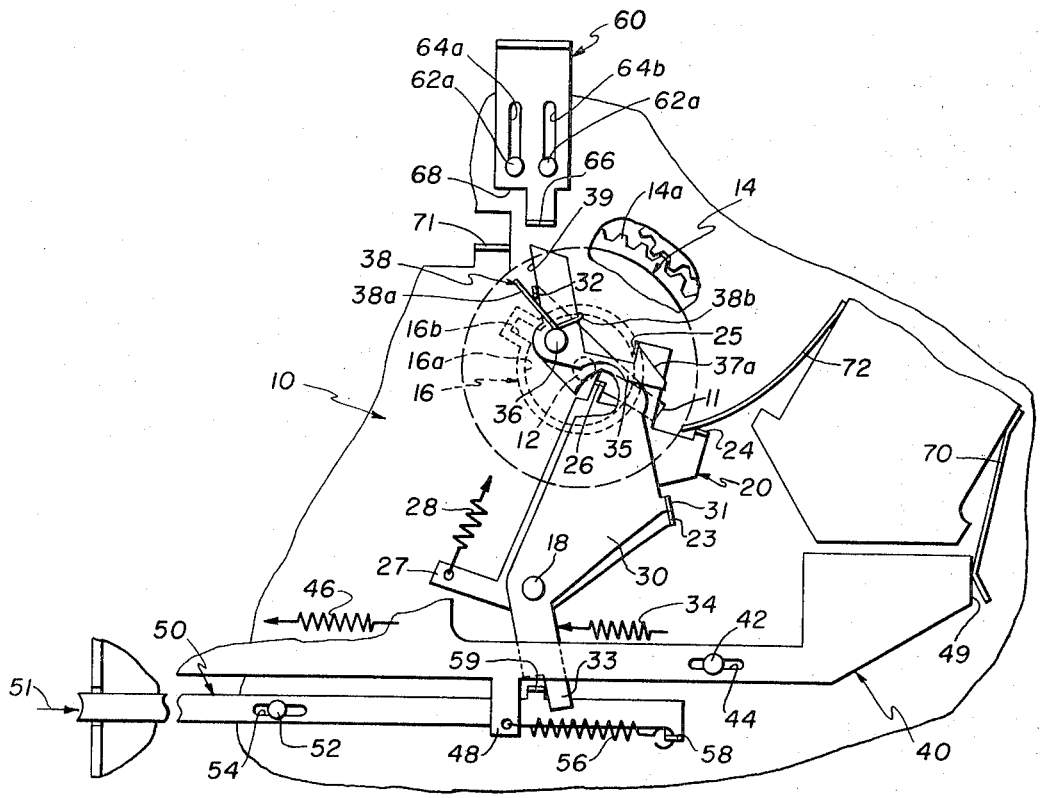
FIG. 2 is a fragmentary plan view of the mechanism shown in FIG. 1 showing the single frame device in an unactuated position.
Figure 3:
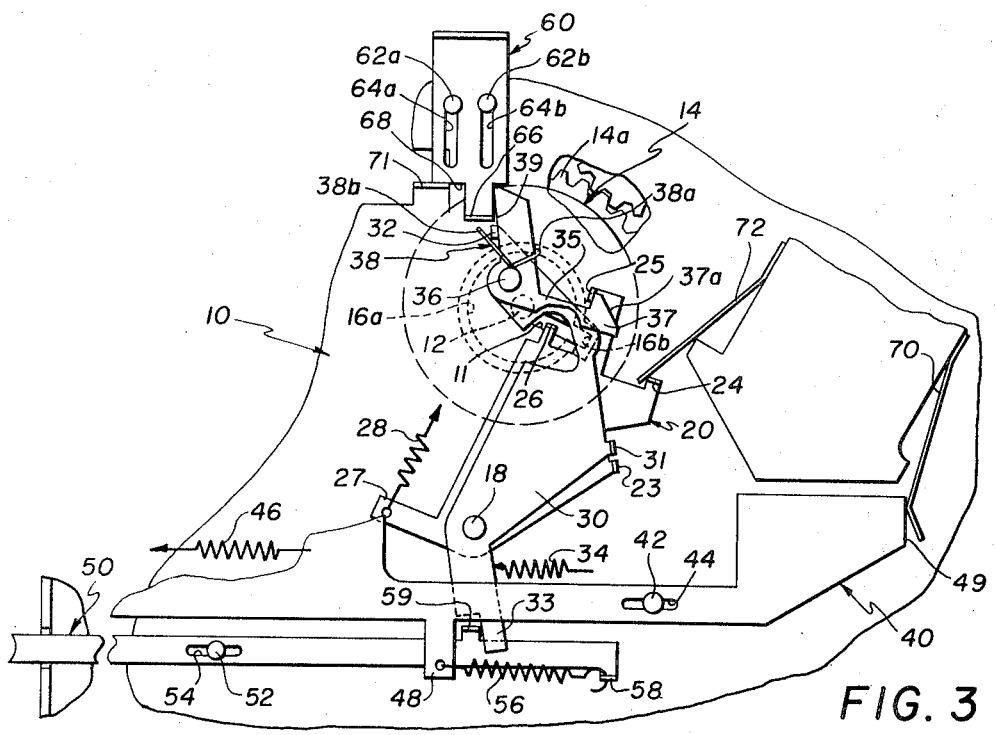
FIGS. 3 and 4 are fragmentary views similar to FIG. 2 but showing the single frame device in its actuated position cooperating with various members of the motion picture camera.

A catch 35 which includes a hook-shaped projection 37 and an arm portion 39 is pivotally supported near one end of the crank arm 30 by a rivet 36. Catch 35 is normally urged in a counterclockwise direction about rivet 36 by a spring 38 such that the hook portion 37 is urged into engagement with the tab member 25 of bracket 20 as shown in FIGS. 1, 2 and 3. When thus engaged, catch 35 is effective through the cooperation with tab member 25 to rotate bracket 20 in a counterclockwise direction about rivet 18 whenever crank arm 30 is rotated in the counterclockwise direction against the urging of spring 34 toward the position shown in FIGS. 2, 3 and 4.

Figure 4:
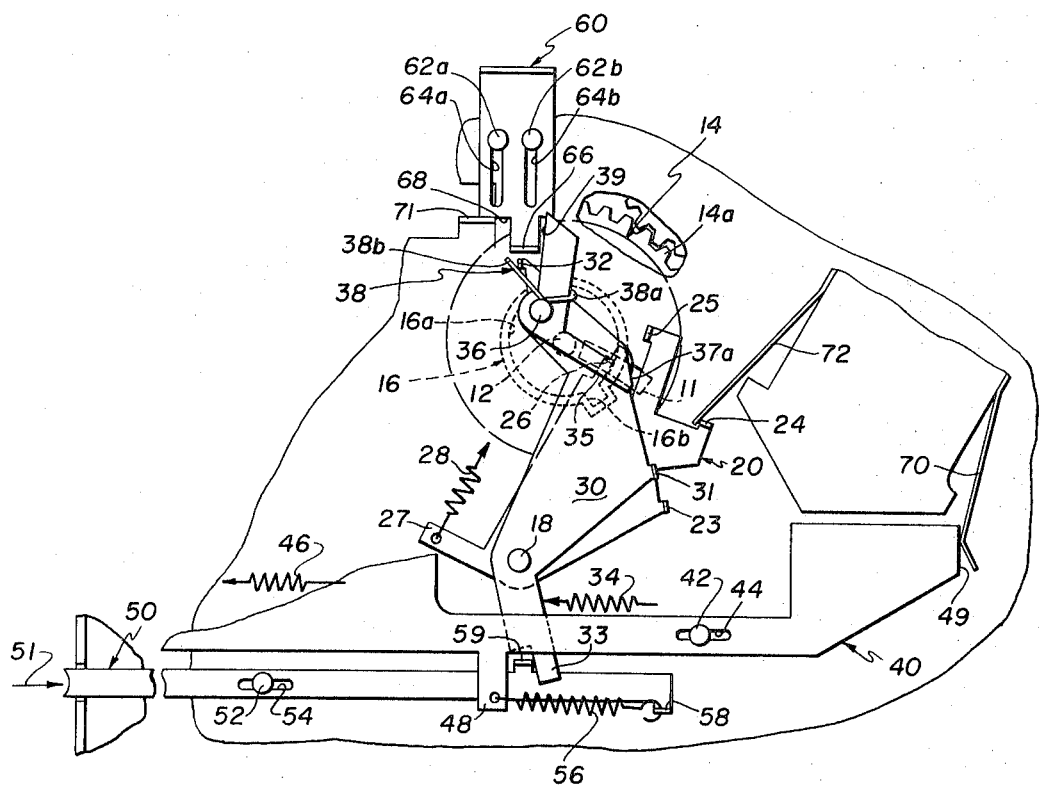

In the preferred embodiment shown in the drawings, a tab member 31 on the crank arm 30 cooperates with the tab member 23 on the bracket 20 such that, when the hook portion 37 is engaged with the tab member 25, they restrain bracket 20 from rotating further in a counterclockwise direction relative to crank arm 30 than shown in FIGS. 2 and 3. Thus, when the bracket 20 and the crank arm 30 are positioned as shown in FIGS. 2 and 3, pawl 26 is held removed from the detent portion 16b by the catch 35 and is maintained a spaced distance from the cylindrical cam surface 16a of the restraining member 16 by the contact between tab members 31 and 23. When hook portion 37 is removed from engagement with tab member 25 as shown in FIG. 4, spring 38 cooperates through the leg portions 38a and 38b to resiliently urge catch 35 in a counterclockwise direction about rivet 36 until the arm portion 39 of the catch 35 is in contact with the tab portion 32 of the crank arm 30. The catch 35 is maintained in that position until the tapered surface 37a of the hook portion 37 is resiliently urged into contact with the tab member 25 through the force applied to crank arm 30 by spring 34, and then the sliding contact between surface 37a and the tab member 25 urges catch 35 in a counterclockwise direction about rivet 36 permitting the hook portion 37 to again be urged into engagement with the tab member 25 for moving bracket 20.

An arm 40 is slidably mounted to the housing 10 adjacent to the cank arm 30 by a rivet 42 which passes through the elongate opening 44 in the arm 40. The shoulder 42a on the rivet 42 maintains the arm 40 a spaced distance from the front side of the camera housing 10 such that tab member 33 of crank arm 30 remains free to pivot between arm 40 and the housing 10. A spring 46 is secured between the arm 40 and a portion of the housing to resiliently urge the arm to the left toward the FIG. 1 position. As will be further described, a spring 56 is secured to the extension 48 on the underside of arm 40 for urging the irregularly shaped portion 49 of the arm 40 to the right into a position for cooperating with the camera control mechanism for controlling the operation of the camera drive motor.

A trigger member 50 is also slidably mounted adjacent to the front side of the camera housing 10 between the extension 48 of the arm 40 and the housing 10 by a rivet 52 which passes through the elongate opening 54 in the trigger member 50. The trigger member 50 includes an extension 58 which is also secured to the spring 56. As previously mentioned, spring 56 is effective for urging arm 40 toward the right whenever the trigger member 50 is actuated or moved to the right in the direction of arrow 51. Spring 56 is also effective for urging trigger member 50 to return toward the unactuated (FIG. 1) position whenever the trigger member 50 is released from the actuated position shown in FIGS. 2, 3 or 4. That is, after the trigger member 50 has been actuated and then is released, arm 40 is moved to the left toward the unactuated (FIG. 1) position under the urging of the spring 46 and then the force applied to the spring 56 is effective to urge the trigger member 50 to the left toward the unactuated (FIG. 1) position.

A lug 59 extends from the top side of the trigger member 50. The tab member 33 of the crank arm 30 is urged into contact with lug 59 by spring 34 which urges crank arm 34 in a counterclockwise direction about rivet 18. When the trigger member 50 is depressed, lug 59 is urged to the right pivoting the crank arm 30 in a counterclockwise direction about the rivet 18 (toward the FIGS. 2, 3 and 4 position) against the urging of spring 34 thereby causing the bracket 20 to be rotated also about rivet 18 in a counterclockwise direction through the cooperation of catch member 35 with the tab member 25 as previously described.

A single frame slide member 60 is secured to the camera housing 10 at a point above the previously described members by rivets 62a, 62b which pass through elongate openings 64a, 64b respectively. Slide member 60 is manually movable by the operator between the unactuated or inoperative position shown in FIGS. 1 and 2, wherein the camera is operable in a normal operating manner as described in the Jenkins et al patent and the actuated or operative position shown in FIGS. 3 and 4 wherein the stop member 71 on the camera housing 10 is contacted by a shoulder 68 on member 60. If desired, slide member 60 can cooperate with an off-center spring or other suitable means to resiliently maintain slide member 60 in either of these two positions. In the preferred embodiment, it has been found that the frictional force between the slide member 60 and the housing 10 is sufficient to maintain the slide member in the position wherein it is placed by the operator. When the slide member 60 is in the actuated or operative position, a tab portion 66 of the slide member 60 is positioned for intercepting the movement of the arm portion 39 of catch 35 to cause a single frame mode of operation of the camera as will be described in greater detail.

Also secured to the front side of the camera housing 10 are a pair of normally open switches 70, 72. The switches 70, 72 are controlled by the selective movement of portion 49 of arm 40 and by tab member 24 on bracket 20 respectively, and are of a suitable type to selectively operate the exposure control circuitry (not shown) and the camera drive motor M respectively. When the switches 70, 72 are both in their normally open or unactuated (FIG. 1) position, the exposure control circuitry and the camera drive motor M are de-energized and do not draw current from the batteries or other power supply of the camera.

Now to explain in greater detail the operation of the preferred embodiment of the single frame device shown, reference will first be made to FIG. 2 wherein the single frame slide 60 is in the unactuated position and the camera is operable for exposing scene images upon a received film at a normal exposure frame rate (i.e., 18 or 24 frames per second) by the operator actuating or depressing the trigger member 50 to the right in the direction of arrow 51. The force applied by the operator creating a small amount of movement of the trigger member 50 results in the force applied to arm 40 by the spring 56 overcoming the force applied to arm 40 by the spring 46 and the arm 40 is urged to the right toward the position shown in FIGS. 2, 3 and 4. During initial movement of arm 40 the portion 49 of arm 40 is driven into contact with the switch 70 and moves the switch to a closed position, thereby actuating the exposure apparatus (not shown) of the camera. The portion 49 of arm 40 remains in contact with the switch 70 and maintains the switch 70 closed until the trigger member 50 is released by the operator to permit the trigger member 50 and the arm 40 to return to the unactuated (FIG. 1) position under the urging of springs 46 and 56 as previously described. The continued movement of the trigger member 50 by the operator causes the crank arm 30 to be pivoted in the counterclockwise direction due to the engagement of projection 59 with tab 33, thereby resulting in the hook position 37 of catch 35, acting through tab member 25, rotating bracket 20 in a counterclockwise direction about rivet 18. As previously mentioned, this counterclockwise movement of bracket 20 is effective to remove the pawl 26 from the detent or stop portion 16b of the restraining member 16 into a position wherein the pawl 26 is positioned within the periphery or confines of the generally cylindrical cam surface 16a of the restraining member 16. This counterclockwise movement of bracket 20 is effective to bring the tab member 24 into contact with and to close the switch 72 thereby actuating the camera drive motor M for driving the received film past an exposure aperture (not shown) of the camera. When the camera is operating in the normal mode of operation (e.g., other than in the single frame mode of operation), the camera drive motor M continues to drive the gear 14 for exposing the received film until the trigger member 50 is released by the operator. It should be noted that, in the preferred embodiment, once the pawl 26 has been removed from the detent or stop portion 16b and the gear 14 has been rotatably driven by the camera drive motor M, the pawl 26 is presented by the generally cylindrical cam portion 16a from returning into the detent or stop portion 16b until the gear 14 had been driven by at least one complete rotation even if the trigger member 50 is released. This is important for it prevents the tab member 24 from releasing the switch 72 until the camera drive motor (not shown) has driven the camera shutter mechanism (not shown) to a position where it blocks the exposure aperture (not shown) of the camera. As is well known, this is desirable to prevent light from contacting the received film through the exposure aperture when the camera is not actuated.

The single frame slide member 60 can be depressed to its actuated or operative position (FIGS. 3 and 4) wherein the tab portion 66 of the slide member 60 is in the path of the movement of arm portion 39 of catch 35 to permit a single frame mode of operation of the camera as will be described now. When slide 60 is in the single frame position and the operator actuates the trigger member 50 toward the FIG. 3 position, the switch 70 is closed for actuating the exposure control circuitry (not shown) of the camera. As previously described, initially the bracket 20 and the crank arm 30 are moved in the counterclockwise direction removing the pawl 26 from the detent or stop portion 16b of the restraining member 16. The movement of the crank arm 30 in the counterclockwise direction toward the FIG. 3 position brings the arm portion 49 of the catch 35 into contact with the tab portion 66 of slide member 60. Further movement of the trigger member 50 toward the FIG. 4 position results in the closing of the switch 72 by the tab member 24 to actuate camera drive motor M to drive the gear 14. Such movement simultaneously results in arm portion 39 cooperating with and the tab portion 66 to urge catch 35 in a counterclockwise direction about rivet 36 against the urging of leg spring 38. As shown in FIG. 4, this movement of catch 35 in the counterclockwise direction is sufficient to release tab member 25 of bracket 20 from the hook portion 37 of catch 35 and permit the pawl 26 to be urged by spring 28 into contact with the generally cylindrical cam surface 16a of the retaining member 16. At this time, the motor has driven gear 14 enough to prevent pawl 26 from dropping into stop 16b. As previously mentioned, the generally cylindrical cam surface 16a cooperates with pawl 26 to restrain the bracket 20 from being returned by the spring 28 to the FIG. 1 position until the gear 14 has been driven through one complete revolution and once again returns to the position wherein the pawl 26 is aligned with the detent or stop portion 16b of the restraining member 16. When the parts are in their single frame (FIG. 4) position, pawl 26 does return into the detent or stop portion 16b, under the urging of spring 28 upon bracket 20, and tab member 24 releases the switch 72 permitting the switch to return to its normally open position wherein it is no longer effective to energize the camera drive motor M. This particular sequence of movements is effective to assure that only a single frame of film to be exposed and to de-energize the camera drive motor M even if the operator maintains the trigger member 50 in the actuated position. To expose another image frame, the operator need only release the trigger member 50 and then again actuate the trigger member. The releasing of the trigger member 50 permits the hook portion 37 of catch 35 to once again engage the tab member 25 on the bracket 20 such that movement of bracket 30 by the trigger member 50 is once again effective to remove pawl 26 from the stop or detent portion 16b and the mechanism is once again in the position shown in FIG. 1 and is in condition for again exposing a single image frame onto the film. To resume normal operation, the operator need only to release the trigger member 50 momentarily and return the single frame slide member 60 to the unactuated or inoperative positions as shown in FIGS. 1 and 2.

The invention has been described with particular reference to a preferred embodiment thereof, but it will be understood that variations and modifications can be effected within the spirit and scope of the invention.

I claim:

1. A single frame device for a motion picture camera adapted to receive a film strip for successively exposing a plurality of image frames onto a received film strip, said device comprising:
   a. drive means for advancing said film strip, said drive means including an electric motor;
   b. control means for energizing and de-energizing said drive means, said control means including an electric switch and circuit means connecting said electric switch to said electric motor; and
   c. means operatively coupling said control means and said drive means, such that said control means de-energizes said drive means after a single image frame has been exposed, said coupling means including:
      i. a pawl member operatively coupled to said electric switch, said pawl member being movable between a first position wherein said electric switch is open and a second position wherein said electric switch is closed for energizing said electric motor,
      ii. means for moving said pawl between said first and second positions, and
      iii. a restraining member comprising a generally cylindrical cam surface having a first portion for receiving said pawl when said pawl is in said first position and having a second portion for restraining said pawl in said second position until said restraining member rotates to a position wherein said pawl is received by said first portion.

2. A single frame device as set forth in claim 1 wherein said means for moving said pawl between its first and second position comprises:
   a. a bracket supporting said pawl, said bracket pivotally supported for movement between, (1) a first position wherein said pawl is positioned in its first position, and (2) a second position wherein said pawl is positioned in its second position;
   b. resilient means for urging said bracket toward said first position;
   c. catch means releasably engageable with said bracket for moving said bracket toward said second position, said catch means changeable between, (1) a first condition wherein said catch means is in engagement with said bracket for moving said bracket, and (2) a second condition wherein said catch means is disengaged from said bracket and is ineffective to move said bracket toward said second condition;
   d. a crank arm for supporting said catch means for movement between, (1) a first position wherein said bracket is in its first position, and (2) a second position wherein said bracket is in its second position; and
   e. means for moving said crank arm between said first and second positions.

3. The single frame device as set forth in claim 2 wherein said means for moving said crank arm between said first and second positions comprises:
   a. resilient means for urging said crank arm toward said first position; and
   b. trigger means for cooperating with said crank arm for moving said crank arm toward said second position.

4. A single frame device for a motion picture camera adapted to receive a film strip for successively exposing a plurality of image frames onto a received film strip, said device comprising:
   a. a film claw for engaging and advancing said film strip;
   b. an electric motor operatively coupled to said film claw for driving said film claw;
   c. an electric switch changeable between, (1) an open condition, and (2) a closed condition;
   d. circuit means connecting said electric switch to said electric motor such that when said switch means is in said open condition said electric motor is de-energized, and when said electric switch is in said closed condition said electric motor is energized for driving said film claw;
   e. a bracket for changing said electric switch between said open and closed positions, said bracket being movable between, (1) a first position wherein said electric switch is in its open condition, and (2) a second position wherein said electric switch is in its closed condition;
   f. resilient means for urging said bracket toward its first position;
   g. means for selectively moving said bracket toward said second position whereby said electric switch is changed to said closed condition and said electric motor is energized;
   h. a pawl member supported by said bracket for restraining movement of said bracket from its second position toward its first position; and
   i. restraining means adapted to be rotatably driven by said electric motor when said motor is energized, said restraining means comprising a first portion adapted to receive said pawl when said bracket is in its first position and a second portion adapted to cooperate with said pawl after said bracket has been moved to said second position, for maintaining said bracket in its second position until said restraining means has been rotated to a position wherein said first portion is moved adjacent to said pawl and said resilient means can urge said bracket toward said first position.

5. The single frame device as set forth in claim 4 wherein said second portion comprises a generally cylindrical cam surface having an opening therein and said first portion is adjacent said opening in said second portion.

6. The single frame device as set forth in claim 4 wherein said means for selectively moving said bracket toward said second position comprises:
   a. catch means releasably engageable with said bracket for moving said bracket toward said second position, said catch means changeable between, (1) a first condition wherein said catch means is in engagement with said bracket for moving said bracket, and (2) a second condition wherein said catch means is disengaged from said bracket and is ineffective to move said bracket toward said second condition;
   b. a crank arm for supporting said catch means for movement between, (1) a first position wherein said bracket is in its first position, and (2) a second position wherein said bracket is in its second position;

c. a single frame slide member movable between, (1) a first position wherein said slide member is ineffective to engage said catch means, and (2) a second position wherein said slide member is effective to engage catch member to change said catch member from said first condition to said second condition; and d. means for selectively moving said bracket toward said second position wherein said electric switch is changed to said closed condition and said electric motor is energized.

\* \* \* \* \*